UNITED STATES PATENT OFFICE.

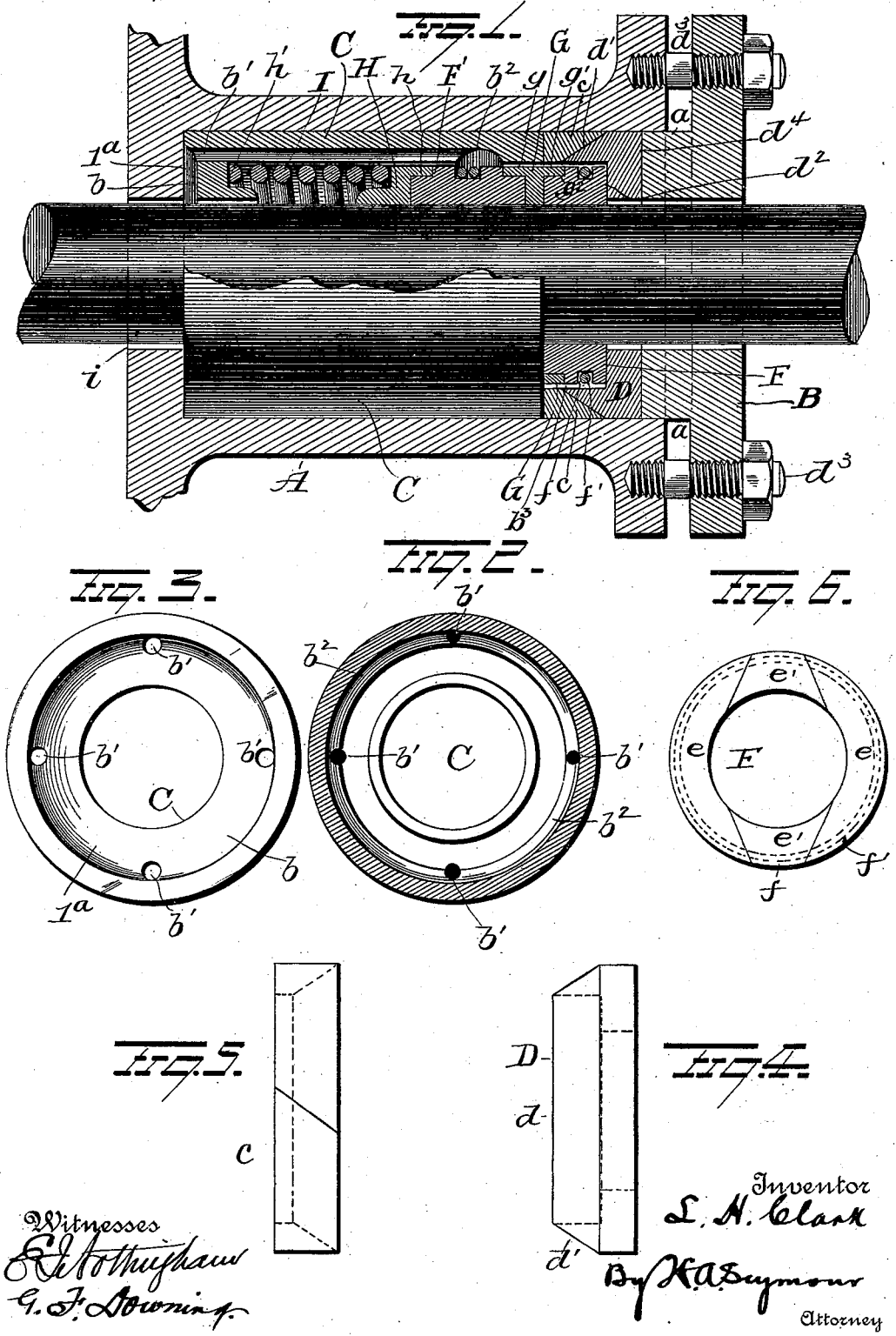

LOUIE H. CLARK, OF FOND DU LAC, WISCONSIN.

PISTON-ROD PACKING.

SPECIFICATION forming part of Letters Patent No. 534,388, dated February 19, 1895.

Application filed April 9, 1894. Serial No. 506,893. (No model.)

*To all whom it may concern:*

Be it known that I, LOUIE H. CLARK, a resident of Fond du Lac, in the county of Fond du Lac and State of Wisconsin, have invented certain new and useful Improvements in Piston-Rod Packing; and I do hereby declare the following to be a full, clear, and exact description of the invention, such as will enable others skilled in the art to which it appertains to make and use the same.

My invention relates to an improvement in piston rod packing the object of the invention being to produce a packing capable of use in any stuffing box, and to so construct the device that the intimate contact of the packing rings with the piston rod will be effectually maintained; so that the piston rod will be permitted to vibrate to any necessary extent without causing a leakage of steam past the packing rings and so that steam will be permitted to positively press the packing rings against the piston rod without permitting the steam to follow the piston rod out of the stuffing box.

A further object is to produce a piston rod packing which shall be simple in construction, comparatively cheap to manufacture and easy to assemble and which shall be effectual, in every respect, in the performance of its functions.

With these objects in view the invention consists in certain novel features of construction and combinations and arrangements of parts, as hereinafter set forth, and pointed out in the claims.

In the accompanying drawings: Figure 1 is a view partly in section illustrating my improvements. Figs. 2, 3, 4, 5 and 6 are detail views.

A represents a stuffing box and B the gland, the latter being constructed with an annular portion $a$ adapted to enter the outer end of the stuffing box for a purpose hereinafter explained. Within the stuffing box, a cylinder or cage C is located, the inner end of which bears tightly against the inner end wall of said stuffing box, as shown in Fig. 1, the inner or rear end of the cylinder or cage being also recessed (as at $1^a$ Fig. 3), to produce a passage or duct $b$ which communicates with a series of ports $b'$ made in the walls of the cylinder or cage, said ports communicating with a chamber $b^2$ made by recessing the inner wall of the cylinder or cage. The ports $b'$ may be produced by perforating the rear end of the cylinder or cage and making grooves in the inner wall thereof communicating at one end with these perforations and at the other end with the chamber $b^2$, or said ports may be produced by boring holes in the wall of the cylinder or cage, said holes communicating at one end with the duct $b$ and at the other end with the chamber $b^2$.

Within the stuffing box, at the outer end of the cylinder or cage C, an expander ring $c$ is located and adapted to bear snugly against the inner wall of said cylinder. This ring may be made in sections, the meeting ends of the sections being beveled, but I prefer to make it in one piece, split diagonally at one point. One edge of the ring $c$ is made so as to be at right angles to the periphery thereof and has a square bearing against the outer end of the cylinder or cage C, and the other edge is inclined or beveled as shown in Fig. 1. A ring or expander D is located in the outer end of the stuffing box and provided with a rearwardly projecting flange $d$ having an inclined or beveled edge $d'$ adapted to bear snugly against the inclined or beveled edge of the expander ring $c$, and the inner face $d^2$ of this flange is concentric with the bore of the stuffing box. When the gland B is secured in position by means of screws $d^3$, or otherwise, the annular portion $a$ of said gland will enter the stuffing box and bear squarely against the straight outer face $d^4$ of the expander ring D. From this construction it will be seen that the pressure exerted against the ring D by the gland B will cause the beveled or inclined edge of the former to press against the inclined or beveled edge of the ring $c$, thus compelling the latter to lie tightly against the inner wall of the stuffing box and in this manner prevent the escape of steam pass it. The ring $c$ will not only be made to bear tightly against the inner wall of the stuffing box but will also cause said ring $c$ to bear tightly against the outer end of the cylinder or cage C, thus making a steam tight joint between these parts. Pressure being thus applied to the cylinder or cage C, the rear end thereof will be made to bear tightly against the inner end of the stuffing box, so that steam will be prevented from entering between said cylinder or cage and the inner wall of the stuffing box.

Encircling the piston rod E, in proximity to the outer end of the stuffing box, is a sectional packing ring F, of suitable metal and at one end this packing ring bears tightly against the inner or rear face $d^2$ of the expander ring D so as to produce a steam tight joint, said inner face of the ring D being made straight or at right angles to the periphery of said ring. The packing ring F preferably comprises four sections, two large ones $e$, and two small ones $e'$. The ends of the larger sections are beveled inwardly and the abutting ends of the smaller sections are beveled outwardly, the smaller sections being located between the ends of the larger ones. Instead of beveling the sections of the packing ring in this manner, the beveling may be done in the reverse order.

The packing ring F is made with grooves $f$ in its outer face for the reception of springs $f'$. Another packing ring $f'$ surrounds the piston rod E and is constructed the same as the ring F, except that it is preferably about twice as long as the latter. Between the packing rings F and F', a spacing ring G encircles the piston rod, said ring G having flanges $g$, $g'$ projecting into recesses $g^2$, made in the periphery of the respective packing rings, these flanges serving to retain the packing rings in intimate contact with the piston rod.

In packings for piston rods, where several sectional packing rings abutting against each other are employed, it is necessary to so arrange the several rings relatively to each other that the sections of one ring will break joints with the sections of the adjacent rings, but with the use of the spacing ring G the necessity for thus causing the sections of one ring to break joints with the sections of the adjacent rings is obviated.

At the rear end of the packing ring F', a follower ring H encircles the rod E and bears squarely against the rear end of said packing ring F', said ring H being also provided with a flange $h$ adapted to enter a recess made for it in the periphery of the packing ring F' at the rear end thereof, as shown in Fig. 1. In rear of the follower ring H, a coiled spring I is located, one end of said spring bearing against said follower ring and the other end having its bearing in a recess $h'$ at the rear end of the cylinder or cage C. The spring does not come into contact with the wall of the cage, nor with the piston rod, and where it bears against the end of the cage and the follower ring, it is preferably flattened so as to have a square bearing on these parts.

It will be observed that the opening $i$ at the rear end of the stuffing box, through which the piston rod passes, is somewhat larger than the diameter of said piston rod, so that steam from the engine cylinder will be permitted to pass through this opening (around the piston rod) and enter the chamber or duct $b$ at the rear end of the cylinder or cage C, from which chamber or duct the steam will pass through the ports $b'$ and enter the chamber $b^2$ and also the space $b^3$. It is apparent that when steam is thus admitted into the packing, it will act positively on the packing rings to force them tightly against the piston rod and effectually prevent the admission of any steam whatever between said packing rings and the piston rod, thus preventing leakage of the packing, the steam in the chamber $b^2$ and space $b^3$ being prevented from escaping through the gland by the intimate contact of the packing ring F with the square face of the expander ring D as above explained, this intimate contact between said parts being effectually maintained by the action of the spring I, said spring also serving to retain the rings F, F', G and H in intimate contact with each other.

It will be observed that not only is the opening in the rear end of the stuffing box through which the piston rod passes, larger than said rod, but that the opening in the gland through which said rod passes is also larger than the rod.

One very important feature of the packing constructed as above described, is that it is capable of effectually packing a rod which is out of line with the stuffing box, and it will admit of the vibration that any piston rod will have, such, for instance as those used on locomotives where there is a great deal of jar and vibration, constantly, and on marine engines, &c. It is evident that when the piston rod rises or lowers, or moves sidewise or in any direction whatever, out of the center of the stuffing box, as is the case when the rod is out of line or vibrates from sudden jarring, the rings F, F', G and H will all move together, as though they were all made in one piece, with the rod in any direction and the steam tight joint between the rings D and F will always be perfectly tight because the ring F can work in all directions against the face of the expander D. The space $b^3$ is large enough to admit of all movements out of the true center of the stuffing box that the rod may take.

My improvements are simple in construction and effectual, in all respects, in the performance of their functions.

Slight changes might be resorted to without departing from the spirit of my invention or limiting its scope and hence I do not wish to limit myself to the precise details of construction herein set forth, but, Having fully described my invention, what I claim as new, and desire to secure by Letters Patent, is—

1. In a piston rod packing the combination with a stuffing box, a gland and a piston rod operating in the box and gland, of a cage consisting of an imperforate shell or cylinder fitted inside of the stuffing box, a pair of expander rings, one adapted to rest snugly against the outer end of the cage and provided at its outer end with a beveled flange, and the other expander ring also having a beveled end which enters the beveled end of the ring against the cage, the gland adapted to bear on the outer end of this last mentioned expander ring whereby to hold the rings, substantially as set forth.

2. In a piston rod packing, the combination with a stuffing box, and piston rod, of a cage fitted inside the stuffing box, expander rings at the outer end of the cage, packing rings located inside of the cage and bearing against the rod, a spring bearing at one end against the inner end of the cage and outward at the other end against the packing rings, the outside expander ring bearing against the outside packing ring, and a gland bearing against this outside expander ring, substantially as set forth.

3. In a piston rod packing, the combination with a stuffing box and piston rod, of a cage having a solid outer wall which fits the inner wall of the stuffing box, said cage having a chamber formed at each end and ports within the outer surface of the cage connecting these chambers, packing rings within the cage, a spring bearing outwardly against said rings, expander rings bearing one against the cage and the other against the latter expander ring and the packing rings, and a gland bearing against the outer expander ring, substantially as set forth.

4. In a piston rod packing, the combination with a piston rod a stuffing box and a gland, of a cylinder located within the stuffing box and having a steam passage at one end, a steam chamber between its ends, and ports connecting said steam passage and steam chamber, a sectional packing ring surrounding the piston rod coincident with said steam chamber, rings at the ends of said packing rings and having flanges overlapping the same, and a spring bearing at one end against one of said rings and at the other end having a bearing at the rear end of the cylinder, substantially as set forth.

5. In a piston rod packing, the combination with a piston rod, a stuffing box and a gland, of a cylinder located in the stuffing box and having an opening at one end larger than the diameter of the piston rod and also having a steam passage at one end, two sectional packing rings surrounding said piston rod, a spacing ring between the packing rings and having flanges overlapping the packing rings, said rings being so arranged as to leave a space between them and the wall of the cylinder, ports connecting the steam passage with this space, a ring bearing against the rear end of one of said packing rings and having a flange overlapping the same, and a spring bearing at one end on said last-mentioned ring and at the other in a recess at the rear end of the cylinder, substantially as set forth.

6. In a piston rod packing, the combination with a piston rod and a stuffing box, of a cylinder located in the stuffing box and bearing at its rear end against the rear end of the stuffing box, a split ring bearing against the other end of the cylinder and having its opposite face beveled, a continuous ring having a beveled face bearing against the beveled face of the split ring so as to force the latter against the wall of the stuffing box, a gland bearing against said continuous ring, a sectional packing ring surrounding the piston rod and bearing against said continuous ring, and a spring adapted to maintain the contact between said section packing ring and the continuous ring intimate so as to prevent the passage of steam past the latter, and means for permitting the admission of steam between the packing ring and the wall of the cylinder, substantially as set forth.

7. In a piston rod packing, the combination with a stuffing box and a piston rod, of a cage therein, a ring within the stuffing box and bearing on the end of the cage, said ring having a beveled face, a packing ring encircling the piston rod, and a ring having a flat face bearing against said packing ring and having a beveled face bearing against the beveled face of the first-mentioned ring, substantially as set forth.

In testimony whereof I have signed this specification in the presence of two subscribing witnesses.

LOUIE H. CLARK.

Witnesses:
EDWARD KENT,
LUCIA A. FERRIS.